3,745,196
LOW-TEMPERATURE AND OIL-RESISTANT CORE-SHELL ACRYLIC POLYMERS
Constance A. Lane, Philadelphia, and William H. Harrop, Uwchland, Pa., and Roger K. Graham, Cherry Hill, N.J., assignors to Rohm and Haas Company, Philadelphia, Pa.
No Drawing. Continuation-in-part of application Ser. No. 827,945, May 26, 1969. This application Jan. 19, 1972, Ser. No. 219,167
Int. Cl. C08f 15/40
U.S. Cl. 260—881
26 Claims

ABSTRACT OF THE DISCLOSURE

Acrylic elastomers, prepared by a poly-stage polymerization procedure in which a first-stage polymer is at least partially encapsulated with subsequent polymer, are provided. The first-stage polymer includes at least 50% by weight monomeric acrylate which when homopolymerized produces a polymer having a glass temperature below about −35° C., such as butyl acrylate, optionally with minor proportions of other alkyl acrylates and substituted alkyl acrylates such as alkoxy- and nitrile-substituted alkyl acrylates, and generally one or more curing-site monomers that contribute sites for vulcanization of the elastomer. For rapid cure, it is preferred to use a monomer with active chlorine as the cure-site. The final-stage polymer comprises at least 60% by weight ethyl acrylate and/or methyl acrylate, from 0 to 40% of an acrylic nitrile, and, preferably, a curing-site monomer. Optional intermedaite polymerization stages can be interposed between the first-stage polymerization and the final stage polymerization. The elastomers can be compounded and vulcanized to produce elastic polymers having rubbery physical characteristics having a balance of desirable properties which permits their use as automotive gaskets, transmission seals, and the like in demanding automotive environments. The elastomers are also useful in coating compositions such as for paper and in caulks.

---

This application is a continuation-in-part of our co-pending patent application, Lane, Harrop and Graham, S.N. 827,945, filed May 26, 1969.

This invention relates to acrylic elastomers and to a process for making such elastomers. More particularly, the invention relates to vulcanizable acrylic elastomers, to processes for their manufacture, and to vulcanized elastomers which possess a unique combination of desirable properties including low temperature flexibility, oil resistance, high tensile strength, and/or thermal stability.

Commercially available acrylic elastomers possess thermal and oxidation stability, and resistance to sulfur-bearing oils after vulcanization superior to most other elastomers, especially natural and synthetic rubbers. Vulcanized products made from these acrylic elastomers thus have desirable properties for use in gaskets, seals, O-rings, belting, wire coatings and hydraulic hose. The elastomers of this invention are also useful as bonding agents for textiles, paper, and non-woven fabrics. For example the elastomer may be applied in emulsion form to non-woven fibers and air dried to provide exceptional toughness to the bonded fabric. The air dried elastomer has excellent adhesion to glass, such as fiber glass, and other fibers such as polyester and blends of viscose rayon, nylon, and cellulose acetate. The elastomers of this invention may also be used as a bonding agent for cellulosics, such as in the production of paper. The elastomers are also useful in caulking compounds to take advantage of good adhesion to substrates and the tough physical characteristics of the elastomer.

Utility at high temperatures, for example 350° F., and resistance to sulfur-bearing oils are important characteristics of acrylic elastomers. Early acrylic elastomers were acrylic ester copolymers, containing a small amount of polyfunctional comonomers such as 2-chloroethyl vinyl ether, vinyl chloroacetate, or 2-chloroethyl acrylate. The polyfunctional comonomer provides reactive sites for vulcanization with curing agents such as amines. After vulcanization of this type of acrylic elastomer, there is no residual unsaturation, and these polymers are thus not degraded by contact with sulfur or oxygen.

On the other hand, poor processing (splitting and sticking to the mill) and poor low temperature flexibility have been important deficiencies of prior art acrylic elastomers. Thus, early commercial acrylic elastomers generally exhibited poor compounding characteristics and poor low-temperature flexibility.

Recently, the major producers of acrylic elastomers have developed new products with improved low-temperature properties. It has been necessary, however, to sacrifice thermal stability, tensile strength and/or oil resistance to achieve the improvement in these low-temperature properties. Attempts to improve the low-temperature properties of acrylic elastomers have generally involved substitution of butyl acrylate-based polymers for the conventionally used ethyl acrylate-based polymers. Butyl acrylate polymers generally provide excellent low-temperature properties, but their use can yield poor tensile strength and very poor oil resistance. It has been proposed to incorporate comonomers such as acrylonitrile, or 2-cyanoethyl acrylate, with butyl acrylate to improve the oil resistance of a butyl acrylate polymer. However, the introduction of such acrylic comonomers in quantities sufficient to improve oil resistance has been found to affect adversely the low-temperature properties of even a butyl acrylate-base copolymer.

Thus, there has been a continuing search for acrylic elastomers which exhibit a combination of good tensile strength, thermal stability, oxidation stability, oil resistance, low-temperature flexibility, and desirable processing characteristics.

It has now been discovered in accordance with this invention that certain acrylic elastomers possess a uniquely desirable balance of these properties. These new elastomers are produced by a di- or multi-stage polymerization reaction. The polymer or polymers formed in the initial stage or stages of the reaction are based on an alkyl acrylate comprising at least 50% acrylic monomer, said polymer exhibiting good low-temperature flexibility and a glass temperature below about −35° C. Ethyl acrylate and/or methyl acrylate which exhibit excellent thermal and oxidation stability and oil resistance, are incorporated in amounts of at least 60% by weight of the final stage of the reaction. Substituted monomers are generally included in both stages to enhance certain physical properties or to provide curing sites for subsequent cure-vulcanization.

It has been discovered that the elastomers formed by this multiple-stage reaction system, when filled with conventional rubber-reinforcing agents such as carbon black and vulcanized, possesses the desirable low-temperature flexibility characteristics of the first-stage polymer. The elastomers also exhibit the thermal stability and tensile properties of the polymer produced by the subsequent stage or stages of the reaction. The oil resistant characteristics of the elastomers approach those of the polymer produced by the subsequent stage or stages of the reaction.

The reasons why the new acrylic elastomers of this invention exhibit such a desirable combination of properties are not fully understood. It is believed, however, that the first-stage polymer is attached to, and may be at least partially encapsulated by, subsequent stage polymers. Thus each subsequent stage polymer partially or completely encompasses or penetrates to some degree into the particles obtained by polymerization of the initial stage or stages. The attachment between the polymer stages may be physical, chemical or a combination of both. The initial stage polymer includes either the first-stage polymer alone or othe first-stage polymer onto which is attached at least one intermediate stage polymer. The attachment of the latter stage polymers and the last stage polymer may be directly onto the first-stage polymer or the attachment may be indirectly onto the first-stage polymer by attachment to intermediate stage polymer or polymers. It is critical that the copolymers be prepared under conditions that cause the particles of the polymer of the first stage to be the site of polymerization of the intermediate and final stage polymers. The polymerization of the latter stage monomer systems must be under conditions such that the polymerization takes place in intimate contact with and preferably on and attached to the preformed polymer particles of the earlier stages. The surface tension is controlled at a level not substantially above the critical micelle level so that essentially no new particles are formed and the attachment may be accomplished. For example, it is preferred that no new emulsifier be added after the first stage polymer is formed to reduce the tendency to form new particles. The emulsifier level preferred in the first stage is less than 3%. It is highly desirable that polymerization of the first-stage monomers be complete before polymerization of the intermediate-stage or final-stage monomers is begun. Simple blends of these polymers of the separate stages prepared independently of one another do not yield the desirable balance of physical properties offered by the copolymers of this invention. By proper use of monomers such as alkoxyalkyl acrylates, alkylthioalkyl acrylates, cyanoalkoxyalkyl acrylates, nitrile-containing monomers, active chlorine containing monomers, and polyunsaturated monomers in the various stages of the polymerization, the advantageous properties of these monomers can be utilized while deleterious side effects, which result when these monomers are added to single stage copolymers, can be suppressed.

Thus, the present invention includes a vulcanizable acrylic elastomer containing at least two polymers that are chemically and/or physically bound together. The elastomer contains a first-stage polymer comprising at least 50% of an alkyl acrylate, the homopolymer of which has a glass temperature below −35° C. or a mixture of alkyl acrylates the copolymer of which has a glass temperature below −35° C.; from 0 to 5% of a polyethylenically unsaturated comonomer which acts as a crosslinking agent; from 0 to 10% of a curing site-containing monomer; and from 0 to 50% of at least one monomer selected from alkoxyalkyl acrylates, alkylthioalkyl acrylates, cyanoalkoxyalkyl acrylates and nitrile substituted alkyl acrylates, all percentages by weight. The elastomer also contains a final-stage polymer which comprises at least 60% of an alkyl acrylate or mixture of alkyl acrylates chosen from the group consisting of ethyl acrylate and methyl acrylate, 0 to 40% comonomers, such as acrylonitrile, lower alkyl esters of acrylic acid, preferably wherein the alkyl group contains 1 to 4 carbon atoms and curing-site monomers. Preferably, the percentage of ethyl acrylate in the final stage exceeds the percent ethyl acrylate, if any, in the polymer of any preceding stage.

In a preferred form, the elastomers of this invention comprise two polymers, including a first stage polymer that is preferably lightly crosslinked, and a second stage polymer polymerized in the presence of, and in intimate contact with, the preformed polymer prepared in the earlier stages. The first-stage polymer includes a major proportion of at least one monomeric acrylate which when homopolymerized forms a polymer having a glass temperature below −35° C., such as butyl acrylate; optionally, a polyethylenically unsaturated comonomer which acts as a crosslinking agent, for example, butylene diacrylate; and optionally a substituted alkyl acrylate such as akoxyalkyl acrylates, alkylthioalkyl acrylates, and nitrile-substituted alkyl acrylates, and optionally, a curing site monomer. The preferred final-stage polymer comprises ethyl acrylate, optionally an acrylic nitrile, and optionally, curing-site monomer.

The new elastomers of this invention are produced by a multiple-stage reaction in which the monomers of the first-stage polymer are first reacted to form polymer particles in emulsion or suspension. Subsequently, the monomers of each additional stage are polymerized in the presence of the polymer of the preceding stage. Preferably, polymer is formed by emulsion polymerization, and the polymerization of the second and each subsequent stage is carried out rapidly to cause at least partial attachment of the polymer to the polymer particles of the preceding stage.

Also falling within the scope of the invention are vulcanized elastomers formed by compounding and curing the new vulcanizable elastomers.

The invention resides in the novel methods, processes, products, compositions, and improvements shown and described. Reference will now be made to the present preferred embodiments of the invention.

In accordance with the present invention, it has been discovered that acrylic elastomers which possess a superior combination of properties can be obtained by a multiple-stage polymerization reaction which produces elastomers containing at least two polymers. A multiple-stage reaction procedure, as contrasted to random copolymerization, is essential to the production of acrylic elastomers of this invention. Elastomers formed in two or more stages by the present process exhibit a uniquely desirable balance of properties after compounding and curing by conventional techniques. A two-stage reaction is presently preferred because the elastomers produced by the relatively simple two-stage reaction exhibit comparable and generally superior properties to those produced by multi-stage reactions.

In its broadest description the elastomers are formed of a polymer comprising a first-stage addition polymer of at least 50% by weight of an alkyl acrylate, the homopolymer of which has a glass temperature below −35° C., or a mixture of alkyl acrylates, the copolymer of which has a glass temperature below −35° C.; 0 to 1% by weight of a polyethylenically unsaturated monomer selected from the group consisting of butylene diacrylate, butylene dimethacrylate and divinylbenzene; 15 to 35% by weight of a monomer chosen from the group consisting of alkoxyalkyl acrylate or alkylthioalkyl acrylate; 0 to 25% by weight of a monomer chosen from the group consisting of cyanoalkyl acrylate and cyanoalkoxy alkyl acrylate; 0 to 35% by weight of a different monoethylenically unsaturated monomer, and 0 to 10% by weight of curing-site monomer, and a final-stage prepared in the presence of the preformed polymer to at least partially encapsulate the preformed first stage comprising the vinyl addition polymerization product of at least 60% by weight of alkyl acrylate or mixtures of alkyl acrylates chosen from the group consisting of ethyl acrylate and methyl acrylate; 0 to 40% by weight of another alkyl acrylate or a substituted alkyl acrylate; 0 to 40% by weight of an acrylic nitrile; and 0 to 10% by weight of said curing-site monomer.

The first-stage polymer is preferably formed from a combination of monomers chosen from five general groups of monomers. These monomers, if polymerized using standard techniques, would in general yield polymers with serious physical property deficiencies. The general groups of monomers suitable for the preparation of the first-stage polymer are (I) alkyl acrylates which when homopolymerized or copolymerized form a polymer having a glass temperature below about −35° C., such as butyl or 2-ethylhexyl acrylate, (II) alkoxyalkyl acrylates or alkylthioalkyl acrylates, such as 2-methoxyethyl acrylate or ethylthioethyl acrylate, (III) cyanoalkyl acrylates such as 2-cyanoethyl acrylate, (IV) monoethylenically unsaturated monomers other than those described in any of the other groups making up the first stage, and (V) curing-site monomers such as those containing either two points of unsaturation, such as crotyl acrylate, or those containing one point of unsaturation and an active halogen such as vinyl chloroacetate, or a point of unsaturation and a functional hydroxyl group, and the like. Monomers containing a combination of the substituents of the monomers above may be included such as a combination of groups (II) and (III) such as cyanoalkoxyalkyl acrylate, for example, cyanoethoxyethyl acrylate.

Acrylic monomers of group (I) suitable for the preparation of the first-stage polymer are alkyl acrylates that when homopolymerized or copolymerized form polymers and copolymers having a glass temperature below −35° C. This group (I) includes, but is not limited to, n-butyl acrylate, n-hexyl acrylate, 2-ethylhexyl acrylate, stearyl acrylate and the like, and mixtures thereof. The use of n-butyl acrylate is preferred because it is relatively inexpensive, readily available, and is readily handled during emulsion polymerization reactions. It should be noted that when monomers of this group (I) are used to prepare homopolymers or standard copolymers, using standard techniques, good low temperature flexibility but poor oil resistance is obtained. Moreover, these homopolymers and copolymers exhibit relatively poor thermal stability and tensile properties. The inclusion of these monomers in the composition of this invention produces elastomers offering the advantages generally obtained with this group of monomers but without the disadvantages.

The first-stage polymer comprises at least 45%, preferably at least 50%, of the group (I) monomers. Preferred first-stage polymers comprise 45 to 83% group (I) monomers, more preferably 50 to 80%. The first-stage polymer may contain as much as 95 to 99.5% group (I) monomers and may constitute entirely group (I) monomers.

In accordance with the preferred forms of this invention, the monomers of group (II) suitable for the first-stage polymers are alkoxyalkyl acrylates which provide good low-temperature flexibility without impairing oil resistance. It has been found that the inclusion of these monomers provides, depending on the nature of the curing agents chosen, curing sites in the elastomer and that conventional curing-site monomers of group (IV) may be omitted or reduced in quantity in the elastomer when the group (II) monomers are present in substantial amounts. Suitable alkoxyalkyl acrylate monomers for incorporation in the first-stage polymer include, but are not limited to, 2-methoxyethyl acrylate, 2-ethoxyethyl acrylate, butoxyethyl acrylate, methoxybutyl acrylate, and the like. These polar acrylates of group (II) copolymerize readily with alkyl acrylates and their incorporation in common copolymers using standard techniques yields good low-temperature flexibilty and good oil resistance but relatively poor thermal stability. The use of group (II) monomers in the elastomers of this invention yields the improvements expected but also yields elastomers with adequate thermal stability. Use of alkoxyalkyl acrylates which contain a relatively long alkoxyalkyl group such as butoxyethyl acrylate and methoxybutyl acrylate, produces less oil resistance than is achieved with the preferred short-chain monomers containing four or less carbon atoms in the alkoxyalkyl group such as 2-methoxyethyl acrylate and 2-ethoxyethyl acrylate. Also included in group (II) monomers suitable for the first-stage polymer are alkylthioalkyl acrylates such as 2-methylthiomethyl acrylate, 2-ethylthioethyl acrylate, butylthioethyl acrylate, methylthioethylbutyl acrylate, and the like. We have found that the inclusion of group (II) monomers in the first stage polymer may provide a lightly crosslinked structure.

The first-stage polymer preferably contains a minor proportion of monomers chosen from group (II). The first-stage polymer preferably comprises 0 to 40% by weight of the group (II) monomers, more preferably 15 to 35% by weight and most preferably 20 to 30% by weight of the first-stage polymer.

The monomers of group (III) suitable for use in preparing the first-stage polymer of this invention are nitrile containing monomers referred to as acrylic nitriles. Suitable nitrile containing monomers include, but are not limited to, 2-cyanoethyl acrylate, 2-cyanopropyl acrylate, 2-cyanoisopropyl acrylate, 4-cyanobutyl acrylate and the like. The inclusion of these acrylic nitriles provides good oil resistance and tensile properties, but if these monomers were incorporated in common copolymers, such as one-stage copolymers, relatively poor low temperatures flexibility would result. The inclusion of these acrylic nitriles in the elastomers of this invention provides the advantages without the expected disadvantage. The incorporation of acrylic nitriles may provide further sites for vulcanization of the elastomer.

The first-stage polymer contains a minor proportion of the monomers chosen from group (III). The first-stage polymer comprises 0 to 25% group (III) by weight of the first-stage polymer, preferably comprises 2 to 20%, more preferably comprises 2 to 15% and most preferably comprises 2 to 12% group (III) all percentages by weight of the first-stage polymer.

The monomers of group (IV) suitable for use in preparing the first-stage polymer are monoethylenically unsaturated monomers other than those of Group (I), (II), (III) or (V) otherwise present in the first stage. Among the suitable monomers are styrene, α-methylstyrene, vinyl aromatics, vinyl and vinylidene halides, vinyl ethers, amides, esters and the like. The group (IV) monomer is present in quantities of 0 to 35 percent.

The monomers of group (V) which are suitable for use in preparing the first-stage polymer of this invention are functional monomers providing cure sites in the elastomer referred to throughout the specification as curing-site monomers. Any copolymerizable compound containing active or potentially active sites for subsequent vulcanization of the finished product is within the scope of this invention. The curing-site monomers include, but are not limited to, polyfunctional monomers containing either two points of carbon to carbon unsaturation differing in reactivity or one point of unsaturation and an active halogen. The inclusion of these monomers provides sites for subsequent curing or vulcanization. These two types of curing-site monomers generally provide faster rates of cure and vulcanization or a higher state of cure than can be obtained when only the monomers of groups (II) and (III) are included in the first-stage polymer. Exemplary of the curing-site monomers which contain two points of unsaturation are those difunctional monomers which contain one point of vinyl unsaturation relatively reactive with the monomers of the other groups used in preparing the first-stage polymer and another point of unsaturation that is relatively unreactive during the polymerization of the first-stage polymer, thereby leaving points of unsaturation after the polymerization of the first stage polymer is completed. These points of unsaturation remaining in the first-stage polymer provide sites for curing and vulcanization of the elastomer using free radical type initiators. Exemplary of these curing-site monomers are unsaturated compounds such as allyl, methallyl, crotyl, 2-butenyl, furfuryl or cyclohexenyl acrylates or methacrylates, allyl ethyl maleate or fumarate and non-conjugated diolefins like 1,4-hexadiene or 5-methylene 2-norbonene.

Other exemplary curing monomers are halogen containing compounds exemplary of which are vinyl haloesters such as vinyl chloroacetate, haloalkyl vinyl ethers such as 2-chloroethyl vinyl ether, halogen containing acrylates such as bromoacetoxy alkyl acrylate or 2-chloroethyl acrylate, and mono and di-halides such as vinyl chloride or vinylidene chloride; epoxy compounds such as glycidyl acrylate or methacrylate, allyl glycidyl ether and the monoepoxides of vinyl cyclohexene or dicyclopentadiene; amide compounds such as acrylamide or methacrylamide and N-methylol acrylamide; amino compounds such as amino ethyl vinyl ether or N substituted amino ethyl methacrylates; hydroxyl compounds such as hydroxyethyl or hydroxypropyl acrylates and methacrylates; and carboxyl compounds such as acrylic and methacrylic acids. The curing site monomers may also include curing agents that function with either an already present cyano and/or alkoxyalkyl functionality or other functionality of the same general type.

The active chlorine curing-site monomers of group (V) may contain a point of unsaturation relatively reactive with the monomers of the other groups of monomers and at least one active halogen substitution. Active halogen curing-site monomers are defined as those monomers wherein the halogen atoms are substituted on carbon atoms which are attached to another carbon atom which is part of an unsaturated or shared electron portion of the compound such as

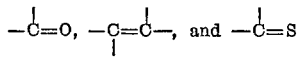

Halogen substitution at other points in the monomer provide cure sites, but the reaction is slower and less preferred. Exemplary of halogen-substituted curing agents and 2-chloroethyl vinyl ether, 2-chloroethyl acrylate, vinylidene chloride, and vinyl chloroacetate. As will be clear from the examples provided later, the copolymerization rate and efficiency of many of the active halogen curing-site monomers is relatively slow and poor. Thus, some of the monomer charge of these monomers does not add onto the polymer stage and is lost. The amount stated in the specification of these monomers in the elastomers of this invention is the amount actually incorporated in the polymer stage or the elastomer as determined by halogen concentration determinations on the polymer or the elastomer, except as otherwise noted.

The amount of the curing-site monomers suitable in preparation of the first-stage polymer preferably should not exceed about 10% by weight of the first-stage polymer and generally should not exceed 5% by weight of the first-stage polymer. Preferably the first-stage polymer comprises group (V) in the range of 0.5 to 5%, more preferably 1 to 5%, by weight of the first-stage polymer. It is preferred that the curing-site monomers be included in all stages. It is more preferred that the amounts of the curing-site monomers be relatively equally distributed throughout the stages. For each stage, the amounts suitable are the same as preferred in the first-stage polymer. For the total elastomer composition, the percentage amounts suitable are the same as preferred in the first-stage polymer. In the embodiments of the invention where other components of the first-stage polymer, such as the monomers of groups (II) and (III), contribute to the cure, the amount of the curing-site monomers of group (V) required to yield the best balance of characteristics is smaller. The inclusion of curing-site monomers is not necessary when the monomers of groups (II) and (III) are incorporated in the first-stage polymer in aggregate amounts of from 15 to 50% by weight of the first-stage polymer. A preferred embodiment of this invention is an elastomer containing 0.1 to 0.4% active chlorine in the first-stage polymer and 0.1 to 0.4% active chlorine in the elastomer. More preferred is an elastomer containing 0.1 to 0.35% active chlorine.

Monomers suitable for the preparation of the first-stage polymer may contain more than one of the functional entities that distinguish the groups of monomers above. Exemplary of these monomers are cyanoalkoxyalkyl acrylates which combine the nitrile and the alkoxy groups to provide improved oil resistance characteristics in the elastomer. These materials include cyanoethoxyethyl acrylate, cyanoethoxypropyl acrylate and cyanomethoxyethyl acrylate. The amounts of these multifunctional monomers suitable for the preparation of the first-stage polymer are generally the same as the amount preferred for groups with single functionality. The lesser amount is preferred.

Optionally, the first-stage polymer may contain a monomer that will provide crosslinking primarily within the first-stage polymer. This crosslinking generally takes place during the polymerization of the first-stage polymer and prior to curing or vulcanization of the elastomer. This crosslinking of the first-stage polymer improves the oil resistance and the tensile properties of the elastomer. To accomplish the crosslinking, a di- or multi-functional comonomer may be incorporated in amounts of up to 2% by weight of the first-stage polymer, preferably up to 1%. Preferred crosslinking agents include, but are not limited to, butylene diacrylate, butylene dimethacrylate, divinylbenzene, and other monomers that achieve relatively uniform copolymerization and crosslinking during the polymerization of the first-stage polymer. Most preferred are those monomers containing at least two acrylate groups.

It is preferred that the total amount of monomers of groups (II), (III), (IV) and (V) and any other optional monomers be present in amounts of from 0 to 50% by weight of the first-stage polymer, and it is most preferred that the total of these groups be present in amounts of at least 20%, that is 20% to 50%, by weight of the first-stage polymer.

In a preferred form of the invention, both an alkoxyalkyl acrylate and a nitrile-containing monomer are incorporated in the first-stage polymer. The weight ratio of alkoxyalkyl acrylate to nitrile-containing acrylate in these preferred first stage polymers can vary from about 2:1 to about 6:1 with the higher ratios resulting in better low-temperature flexibility and the lower ratios providing superior oil resistance and tensile strength.

It is preferred that the weight ratio of the first-stage polymer to the last or the total of the latter stage polymers vary from about 1:1 to about 4:1. In a preferred two-stage embodiment of the process of this invention, the composite elastomer comprises from 50 to 80% by weight of the first-stage polymer with a range of 60 to 75% being preferred. In the three-stage embodiment of the invention, the first composite elastomer preferably comprises from 25 to 50% by weight of the first-stage polymer, while in the four-stage embodiment, the elastomer preferably comprises 15 to 35% by weight of the first-stage polymer.

Intermediate stage polymers, interposed between the first stage polymer and the final stage polymer, can optionally be provided in the elastomers of the invention. These additional stage polymers comprise ethyl acrylate, an alkyl acrylate which when homopolymerized forms a polymer having a glass temperature below about −35° C., and optionally, polyfunctional crosslinking agent. They may also include oil-resistance-improving agents such as alkoxyalkyl acrylates, alkylthioalkyl acrylates, cyanoalkoxyalkyl acrylates, and nitrile-containing acrylates; and small amounts of curing-site monomers such as unsaturated monomers and monomers having one or more active halogen sites.

It is preferred that the intermediate stage polymers are polymerized in the presence of the polymers of the preceding stages to at least partially encapsulate the polymer of each preceding stage. It is desirable to incorporate monomers in the intermediate stage polymer which will give the intermediate stage polymer better oil resistance and high temperature stability than are exhibited by the polymer of the previous stage.

In general, when intermediate polymer stages are used, they contain, with respect to the prior stage, less crosslinking agent, and more ethyl acrylate. Thus, for example, when butyl acrylate is used as the basic monomer in the first-stage, polymer shells of butyl acrylate-ethyl acrylate copolymer (the intermediate stage polymers) at least partially surround a more highly crosslinked butyl acrylate core. The decreasing crosslinker levels and increasing ethyl acrylate content of the intermediate and final polymer stages help to provide flexibility and oil resistance to the composite elastomer. The composite elastomer comprises intermediate-stage polymers, if present, in quantities of 20 to 50% by weight of the composite elastomer.

The final-stage polymer of the elastomers of this invention comprises at least 60% by weight ethyl acrylate and/or methyl acrylate, 0 to 40% by weight of at least one other alkyl acrylate, 0 to 40% by weight of an acrylic nitrile and 0 to 5% of curing-site monomer as described earlier. Preferred is the final-stage polymer comprising at least 70% ethyl acrylate, 0 to 20% of at least one other alkyl acrylate and 0 to 10% of the curing-site monomer. More preferred is 95 to 99.5% ethyl acrylate and 0.5 to 5% of the curing-site monomer such as the active-halogen type. The final-stage polymer may comprise all ethyl acrylate. The presence of the nitrile group in the final-stage polymer tends to increase the initial tensile strength of the composite elastomer and to maintain this high tensile strength during high temperature aging. Thus, optionally, the nitrile-containing monomer may be present in the polymer of the final stage in amounts of 15 to 40% by weight of the final-stage polymer. As less acrylic nitrile is employed in the final stage, generally the more curing-site monomers are needed to facilitate cure. Exemplary of nitrile-containing monomers which can be incorporated into the final stage polymer are acrylonitrile, methacrylonitrile, 2-cyanoethyl acrylate, and 2 - cyanoethoxyalkyl acrylates. While 2-cyanoethyl acrylate tends to produce the most desirable balance of properties when incorporated into the final-stage polymer, acrylonitrile, which is much less expensive, produces highly desirable properties and from a cost standpoint, is highly advantageous. A preferred composition contains up to about 40% acrylonitrile in the second-stage polymer of the elastomer.

Other monomers in small quantities, generally less than 5% by weight may be incorporated. These monomers include but are not limited to alkyl methacrylates, styrene, vinyl acetate, vinyl chloride and the like.

Antioxidants can be incorporated into the present elastomers if desired to enhance thermal and oxidation stability.

In accordance with the process of this invention, polymers formed by the second and any subsequent stage of the polymerization reaction are polymerized in the presence of the polymer formed in the preceding stages. The process produces a composite elastomer in which the initial stage polymer or polymers are at least partially encapsulated by the subsequent stage polymers. This partial encapsulation is believed to be a factor in producing a composite elastomer with a better balance of properties than homopolymers or copolymers produced by simultaneous reaction of all the ingredients or blends of the separate polymers.

Further, the stage-wise reaction procedure of this invention permits the advantageous introduction into the elastomer of monomers such as alkoxyalkyl acrylates, cyanoalkoxyalkyl acrylates, and nitrile-containing acrylates, crosslinking agents and curing-site monomers to obtain advantageous characteristics in the elastomer without the physical limitations that might be expected by the use of these monomers.

Emulsion polymerization techniques are preferred in all stages of the present process, although suspension techniques may be used. In general, the procedure followed for any given stage of the present process can follow the emulsion polymerization techniques described in the specific examples set forth below.

Rapid polymerization rates in the second and any subsequent stages are believed necessary to achieve the desired encapsulation of the polymer of the prior stage. To reduce the tendency to form new particles and to promote encapsulation the emulsifier content of the reaction mixture should be kept at levels below about 5% and generally, as low as possible consistent with low coagulum formation.

It is generally desirable to charge the reactants of each stage, together with water, an emulsifier, catalyst or initiator, and a buffer if needed, into a suitable reaction vessel. A chain regulator may be employed to control the molecular weight of each stage. Relatively lower molecular weight is generally preferred to prevent premature cure and vulcanization of the elastomer during fabrication and to aid flow properties. The first and any subsequent stage polymer reaction should be carried to substantial completion before charging the monomers that react in the following stage. It is desirable to push the polymerization reactions to completion by periodic addition of fresh initiator.

The polymers of this invention can be coagulated in aqueous salt solutions, methanol or acids. Due to the low minimum film-forming temperature and the soft tacky nature of the raw gums, it is preferred to coagulate by spraying fine droplets of the latex into a rapidly agitated salt solution held at room temperature or slightly elevated temperature up to about 70° C. When large drops of emulsion are contacted with the salt solution, they tend to form undesirable spheres of polymers containing uncoagulated latex.

Aluminum sulfate or calcium chloride are preferred salts for use in a coagulating solution, with a 1% solution being effective to provide good coagulation.

After coagulation in a salt solution, the elastomers are washed with water to remove residual salts. The elastomer consolidates into an elastomeric mass that can be compressed between hard rubber rollers to form sheets containing 10 to 20% water. Theسheets of elastomer are desirably dried to less than 1% water content before further processing.

Conventional compounding and vulvanization techniques may be used to convert the vulcanizable elastomers of this invention into their vulcanized form. Generally, amine, soap/sulfur, trimene base (reaction product of ethyl chloride, formaldehyde and ammonia)/sulfur, triethylene tetramine/benzothiazyl disulfide, hexamethylene diamine carbamate/dibasic lead phosphite and the like can be utilized. It is necessary to compound the elastomers of this invention with carbon black or other reinforcing agents before curing if desirably high tensile strength is to be obtained.

The following examples are illustrative of the invention, but are not to be understood as limiting the scope and underlying principles of the invention in any way. All parts and percentages referred to herein are by weight unless otherwise specifically indicated. Percentages in parenthesis are by weight on the stage polymer in which the component is located unless otherwise noted. In the compositions a single slash (/) merely separates the compounds or the amount of those compounds while a double slash (//) separates the polymer stages.

EXAMPLE 1

A two stage heteropolymer is prepared having a first stage comprising butyl acrylate, 2-methoxyethyl acrylate, 2-cyanoethyl acrylate, and butylene diacrylate; and a second stage comprising ethyl acrylate and 2-cyanoethyl acrylate. The ingredients present in each stage and the amounts of each are as follows:

First stage charge:
  1200 ml. deionized water
  157.5 ml. 10% solution of a sodium alkarylpolyether sulfonate emulsifier (SAAES)
  392 grams butyl acrylate
  105 grams 2-methoxyethyl acrylate
  28 grams 2-cyanoethyl acrylate
  0.53 gram butylene diacrylate
  1.58 grams diisopropyl benzene hydroperoxide, 54% active (DIBHP)
Second stage charge:
  105 grams ethyl acrylate
  70 grams 2-cyanoethyl acrylate
  400 ml. deionized water
  52.5 ml. 10% SAAES
  0.88 gram DIBHP The ingredients of the first stage are charged to a three-liter, three-neck flask equipped with a stirrer, thermometer, addition funnel, nitrogen dip tube, and a condenser. Agitation is started, the temperature is adjusted to 35° C., and the emulsion is sparged with nitrogen (0.08 standard cubic feet per hour—s.c.f.h.) for one hour. Polymerization is initiated by the addition of 5 ml. of 1% sodium sulfoxylate formaldehyde (SSF). After an induction period of 5 minutes, an exotherm develops raising the temperature to above 70° C. in 15 minutes. The nitrogen sparge is replaced with a nitrogen sweep (0.02 s.c.f.h.) and the reaction mixture is heated to 80° C. Fresh catalyst (0.30 gram DIBHP) and 5 ml. of SSF are added and the reaction is held at 80° C. for one hour to complete the first stage polymerization reaction.

The ingredients of the second stage are pre-emulsified, and fresh SSF (5 ml. of 1% SSF in deionized water) is added to the first stage reaction mixture. Subsequently, the pre-emulsified second stage reactants are gradually introduced into the flask containing the reacted first stage charge. This addition is completed in four hours with fresh SSF (2.5 ml. of 1% SSF) being added every hour during the addition while the temperature is maintained at 80° C. Subsequently, fresh catalyst, 0.3 gram DIBHP, and SSF (5 ml. of 1% solution in deionized water) are added and the reaction mass is held at 80° C. for an additional two hours to complete the polymerization.

The polymer solution is filtered through cheese cloth to remove coagulum, coagulated by spraying into a rapidly agitated salt solution consisting of 3000 ml. of deionized water, 10 ml. of 10% SAAES and 30 grams aluminum sulfate 18H$_2$O. This salt solution is held at room temperature. Subsequently, the coagulated polymer is washed and dried. The dry elastomer (673 grams, 96% yield) contained 1.48% nitrogen (equivalent to 13.2% 2-cyanoethyl acrylate).

This elastomer when compounded with 40 parts per hundred of the elastomer carbon black and cured using a hexamethylene diamine carbamate/dibasic lead phosphite (HMDC/DLP) curing agent exhibited very good processability, a Shore A hardness of 69, a ($T_f$) of about −40° C., a linear oil swell of about 9%, and good heat stability.

EXAMPLE 2

Using a procedure similar to that of Example 1, an elastomer is prepared from a first stage polymer reaction mixture comprising 53 parts of butyl acrylate, 18 parts of 2-methoxyethyl acrylate, 4 parts of 2-cyanoethyl acrylate, and 0.1% butylene diacrylate by weight of the first stage polymer. The second stage polymer is prepared from a reaction mixture comprising 19 parts ethyl acrylate and 6 parts acrylonitrile. When this elastomer is compounded with carbon black, and cured with HMDC/DLP, the elastomer is suitable for applications requiring excellent low temperature flexibility and good oil resistance.

EXAMPLE 3

Using a procedure similar to that of Example 1, a two stage elastomer is prepared from a first stage reaction mixture comprising 45 parts of butyl acrylate, 20 parts 2-ethoxyethyl acrylate, 10 parts of 2-cyanoethyl acrylate, and 0.1% by weight of the first polymer of butylene diacrylate. The second stage polymer is polymerized on the first stage polymer from an emulsion containing 19 parts of ethyl acrylate and 6 parts of acrylonitrile. The elastomer of this example when compounded and cured exhibits excellent oil resistance and good low temperature flexibility and is suited for use in automotive seals and gaskets.

EXAMPLE 4

In this example, a two stage elastomer is prepared that possesses excellent low-temperature flexibility.

The first stage reaction is initiated by adding 5 ml. of 1% SSF to the first stage charge listed below, and this reaction is carried to completion using the procedure of Example 1.

First stage charge:
  1200 ml. deionized water
  157.5 ml. 10% SAAES
  385 grams butyl acrylate
  105 grams 2-methoxyethyl acrylate
  21 grams 2-cyanoethyl acrylate
  14 grams 2-chloroethyl vinyl ether
  0.53 gram butylene diacrylate
  1.58 grams DIBHP The second stage charge is identical to that of Example 1 and the same second stage reaction procedure is followed.

The polymer solution is filtered through cheese cloth to remove coagulum (13 grams), coagulated by spraying into a rapidly agitated coagulating solution having the composition described in Example 1 and held at room temperature. Subsequently, the elastomer is washed and dried. The dry elastomer (663 grams, 95% yield) contains 0.61% chloride (equivalent to 1.85% of 2-chloroethyl vinyl ether) and 1.39% nitrogen (equivalent to 12.4% of 2-cyanoethyl acrylate).

After compounding with carbon black, and curing with HMDC/DLP, the elastomer exhibits the following properties: very good processability; a Shore A hardness of 72; a $T_f$ of −40.5° C.; and a linear oil swell of 8.9%. This polymer is well suited for applications where excellent low temperature flexibility is desired.

EXAMPLE 5

A two stage elastomer is prepared that exhibits good physical properties and a rapid rate of cure with standard curing agents. The ingredients present in each stage and the amounts of each are as follows:

First stage charge:
  840 ml. deionized water
  19 ml. of 1% aqueous potassium carbonate
  126 ml. of 10% sodium dodecylbenzenesulfonate (SDBES)
  333.9 grams n-butyl acrylate
  113.4 grams 2-methoxyethyl acrylate
  25.2 grams 2-cyanoethyl acrylate
  9.5 grams vinyl chloroacetate
  0.12 gram t-dodecyl mercaptan
  1.42 grams DIBHP (54% assay)
Second stage charge:
  157.5 grams ethyl acrylate
  3.1 grams vinyl chloroacetate
  0.5 gram DIBHP
  31 ml. 10% SDBES
  100 ml. deionized water The ingredients of the first stage are charged to the equipment used in Example 1, agitation is started, the temperature adjusted to 30° C. and the emission sparged with nitrogen (0.08 s.c.f.h.) for one hour. Polymerization is initiated by the addition of 30 ml. of 1% SSF. An exotherm develops immediately raising the temperature to 70 to 80° C. in 5 to 10 minutes. The nitrogen sparge is replaced with a nitrogen sweep (0.02 s.c.f.h.) and the reaction mixture is heated to 80° C. An additional 5 ml. of SSF are added and held at 80° C. for one and one-half hours to complete the first stage polymerization.

The ingredients of the second-stage are preemulsified and fresh SSF (10 ml. of 1% SSF in deionized water) is added to the first stage reaction mixture held at 80° C. The pre-emulsified second stage reactants are added gradually to the flask containing the reacted first stage charge. The addition is completed in three hours with fresh SSF (10 ml. of 1% SSF in deionized water) being added every hour during the addition while the temperature is maintained at 80° C. The reaction mixture is held at 80° C. for an additional two hours to complete the polymerization.

The latex at 35.7% solids has a viscosity of 38 cps. and a pH of 2.6. The Vistex (30° C. in acetone) of the latex is 1.3. After filtering through cheese cloth to remove coagulum, the latex is coagulated by spraying into rapidly agitated aluminum sulfate solution held at 50 to 70° C. The coagulated polymer is washed and dried to 0.5% water. The dried polymer contains 0.3 to 0.4% chlorine representing 1.2 to 1.35% vinyl chloroacetate incorporated in the polymer.

The elastomer is compounded in the following formulation:

100 parts elastomer
1 part stearic acid
40 parts FEF carbon black
2 parts phenyl β-naphthylamine
5 parts dibasic lead phosphite
1 part hexamethylene diamine carbamate The compound is press-cured 5 minutes at 350° F. and tempered 3 hours at 350° F. The cured elastomer exhibits a $T_f$ of −39° C., a linear oil swell (ASTM No. 3 oil/70 hours/300° F.) of 8.5%, a tensile strength of 1300 p.s.i. and an elongation of 180%. After ageing 70 hours at 300° F. the tensile strength is 1120 p.s.i. and the elongation 125%.

EXAMPLE 6

A two stage polymer prepared using a procedure similar to that of Example 5, exhibits good physical properties including excellent oil resistance.

The ingredients present in each stage and the amounts of each are as follows:

First stage charge:
    840 ml. deionized water
    19 ml. 1% aqueous potassium carbonate
    126 ml. 10% SDBES
    283.5 grams butyl acrylate
    126 grams 2-methoxyethyl acrylate
    63 grams 2-cyanoethyl acrylate
    9.5 grams vinyl chloroacetate
    0.12 gram t-dodecyl mercaptan
    1.42 grams DIBHP
Second stage charge: Same as Example 5

The latex at 35.2% solids has a viscosity of 14 cps., a pH of 2.6 and a Vistex (30° C. in acetone) of 0.94. After coagulation in aqueous aluminum sulfate solution, the polymer is washed and dried to 0.25% water. The dried elastomer contains 0.38% chlorine (representing 1.29% vinyl chloroacetate incorporated in the polymer). This polymer when compounded and cured as in Example 5 exhibits a $T_f$ of −32° C., a linear oil swell of 5.2%

TABLE 1.—PROPERTIES OF CURED, FILLED ELASTOMERS COMPRISING TWO-STAGE HETEROPOLYMERS CONTAINING CNEA, MEA, AND CVE

| Example | Charged composition | | | | | | | Percent CVE in polymer [1] | Tensile strength | | Percent elongation | | Percent linear oil swell | $T_f$, °C. |
|---|---|---|---|---|---|---|---|---|---|---|---|---|---|---|
| | BA | MEA | CVE | CNEA | CVE | BDA | EA | | Original | Aged | Original | Aged | | |
| 7 | 45 | 10 | / | / | 5 | 0.750 | 30 | / | 4.90 | 1,060 | 1,070 | 70 | 60 | 5.7 | −27.0 |
| 8 | 55 | 10 | / | 10 | 5 | 0.750 | 20 | / | 4.75 | 1,230 | 1,170 | 80 | 60 | 10.9 | −39.5 |
| 9 | 55 | 10 | / | / | 5 | 0.750 | 30 | / | 3.06 | 930 | 770 | 100 | 80 | 11.4 | −39.5 |
| 10 | 45 | 20 | / | / | 5 | 0.750 | 20 | / | 4.45 | 930 | 770 | 80 | 50 | 4.7 | −29.0 |
| 11 | 50 | 15 | / | 10 | 5 | 0.750 | 20 | / | 3.67 | 1,040 | 830 | 80 | 50 | 7.2 | −30.0 |
| 12 | 50 | 20 | / | 10 | 5 | 0.750 | 15 | / | 3.87 | 810 | 600 | 60 | 30 | 4.7 | −30.5 |
| 13 | 50 | 20 | / | 10 | 5 | 0.750 | 15 | / | 3.50 | 780 | 750 | 50 | 30 | 5.4 | −34.0 |
| 14 | 50 | 20 | / | 5 | 5 | 0.750 | 20 | / | 3.43 | 1,290 | 870 | 60 | 40 | 6.2 | −35.0 |
| 15 | 50 | 20 | / | / | 5 | 0.750 | 20 | / | 3.65 | 1,080 | 990 | 80 | 40 | 6.2 | −40.0 |
| 16 | 50 | 20 | / | 3 | 2 | 0.750 | 15 | / | 2.1 | 1,340 | 1,310 | 70 | 40 | 8.8 | −40.5 |
| 17 | 50 | 20 | / | / | 2 | 0.380 | 20 | / | | 1,200 | 890 | 100 | 30 | 8.8 | −38.0 |
| 18 | 50 | 20 | / | 3 | 2 | 0.190 | 20 | / | 2.04 | 1,370 | 830 | 140 | 50 | 7.8 | −38.0 |
| 19 | 50 | 20 | / | 3 | 2 | 0.190 | 15 | +2 parts phenyl β-naphthyl amine | 1.39 | 1,340 | 1,240 | 144 | 110 | 8.3 | −39.0 |
| 20 | 55 | 15 | / | 3 | 2 | 0.190 | 20 | | 1.89 | 1,380 | 1,220 | 140 | 65 | 7.8 | −38.5 |
| 21 | 55 | 15 | / | 3 | 2 | 0.190 | 25 | | 1.74 | 1,300 | 1,320 | 145 | 80 | 8.3 | |
| 22 | 55 | 15 | / | 3 | | 0.075 | 15 | | 1.84 | 1,250 | 1,280 | 140 | 115 | 8.9 | −40.5 |
| 23 | 55 | 15 | / | 4 | | 0.075 | 15 | | | 1,210 | 1,170 | 150 | 120 | | |
| 24 | 50 | 20 | / | 5 | | 0.075 | 20 | | | 1,390 | 870 | 220 | 45 | 6.8 | −37.5 |

[1] From actual chlorine analysis.

(ASTM No. 3 oil/70 hours/300° F.), a tensile strength (orig./aged) of 1300/1200 p.s.i., and percent elongation (orig./aged) of 150/125%.

In Tables I–IV, the amount of charged materials in the various stages is shown in parts by weight. The following abbreviations are used in the tables: BA for butyl acrylate; EA for ethyl acrylate; BDA for butylene diacrylate; AN for acrylonitrile; CVE for 2-chloroethyl vinyl ether; MEA for 2-methoxyethyl acrylate; CNEA for 2-cyanoethyl acrylate; VCA for vinyl chloroacetate; and $T_f$ is the temperature in °C., at which the apparent modulus of elasticity of the cured elastomer is 135,000 p.s.i.

EXAMPLES 7–24

Two stage heteropolymers containing both 2-methoxyethyl acrylate and 2-cyanoethyl acrylate are prepared using sodium lauryl sulfate emulsifier at levels of 0.5 to 4%. Excellent conversions and low gum levels are obtained.

After compounding with 40 phr. carbon black, the samples are press-cured for 30 minutes at 300° F. with HMDC/DLP and tempered for 18 hours at 300° F. Tensile strength and elongation are tested before and after aging for 70 hours at 300° F. Linear oil swell is determined in ASTM No. 3 oil for 70 hours at 300° F. Typical test results are shown in Table I.

The series of heteropolymers containing 1% of butylene diacrylate and 5% of 2-chloroethyl vinyl ether in the first-stage polymer produces elastomers with low elongation under cure conditions.

As seen by Table I, the presence of 2-cyanoethyl acrylate in the first stage elastomer provides improved oil resistance with some sacrifice of low temperature flexibility, while 2-cyanoethyl acrylate in the second stage has little effect on either oil resistance or low-temperature flexibility but provides enhanced tensile strength. The presence of 2-cyanoethyl acrylate in the second stage provides excellent protection against loss of tensile strength on heat-aging of cured elastomers containing 2-methoxyethyl acrylate in the first-stage elastomer. These results dramatically demonstrate the advantages of the polystage heterogeneous polymers of this invention.

Reduction in the amount of 2-chloroethyl vinyl ether to 1 to 2% and butylene diacrylate to 0.25% (based on first-stage elastomer) provides elastomers having an excellent combination of properties. However, the thermal stability of these elastomers is not completely satisfactory as evidenced by loss of elongation on heat-aging. Incorporation of small amounts of an antioxidant (such as an aromatic amine) in these elastomers, such as in Example 18, provides the desired thermal stability.

With small amounts of 2-cyanoethyl acrylate in the first stage elastomer a good balance of low temperature properties and oil resistance can be obtained. The presence of 2-cyanoethyl acrylate in both stages permits attainment of a good balance of tensile properties, low temperature flexibility, and oil resistance without any 2-chloroethyl vinyl ether in the polymer.

EXAMPLES 25–39

Two stage polymer containing both 2-methoxyethyl acrylate and 2-cyanoethyl acrylate but without curing-site monomers are prepared. Excellent conversions with generally low gum levels are obtained. After compounding with 40 parts per hundred parts of elastomer (phr.) carbon black and curing with HMDC/DLP, the elastomer have the test properties shown in Table II.

TABLE II.—PROPERTIES OF CURED, FILLED ELASTOMERS COMPRISING TWO-STAGE HETEROPOLYMERS CONTAINING CNEA, MEA AND AN

| Example | BA | / | MEA | / | CNEA | / | BDA | // | EA | / | AN | Percent linear oil swell | $T_f$, °C. |
|---|---|---|---|---|---|---|---|---|---|---|---|---|---|
| 25 | 56 | / | 15 | / | 4 | / | .075 | // | 15 | / | 10 | 8.8 | −39.5 |
| 26 | 56 | / | 15 | / | 3 | / | .075 | // | 15 | / | 10 | 9.3 | −40 |
| 27 | 56 | / | 15 | / | 2 | / | .075 | // | 15 | / | 10 | 9.9 | −40.5 |
| 28 | 56 | / | 15 | / | 4 | / | .075 | // | 16 | / | 9 | 8.8 | −38.5 |
| 29 | 56 | / | 15 | / | 4 | / | .075 | // | 17 | / | 8 | 9.4 | −38.5 |
| 30 | 56 | / | 15 | / | 4 | / | .075 | // | 18 | / | 7 | 9.3 | −38.5 |
| 31 | 56 | / | 15 | / | 4 | / | .075 | // | 19 | / | 6 | 9.4 | −38.5 |
| 32 | 56 | / | 15 | / | 4 | / | .075 | // | 20 | / | 5 | 9.9 | −38.5 |
| 33 | 56 | / | 15 | / | 4 | / | .075 | // | 19 | / | 6 | 9.4 | −38.5 |
| 34 | 55 | / | 16 | / | 4 | / | .075 | // | 19 | / | 6 | 8.3 | −37 |
| 35 | 54 | / | 17 | / | 4 | / | .075 | // | 19 | / | 6 | 8.3 | −37 |
| 36 | 53 | / | 18 | / | 4 | / | .075 | // | 19 | / | 6 | 7.8 | −36 |
| 37 | 52 | / | 19 | / | 4 | / | .075 | // | 19 | / | 6 | 7.3 | −36 |
| 38 | 51 | / | 20 | / | 4 | / | .075 | // | 19 | / | 6 | 6.8 | −35.5 |
| 39 | 53 | / | 18 | / | 4 | / | .075 | // | 19 | / | 6 | 7.8 | −38 |

Elastomers based on MEA and CNEA provide cure sites for good cure and vulcanization to yield excellent products with adequate resistance to oil and good low temperature flexibility. Concentrations of AN in the last stage polymer of 20 to 40% (5 to 10% in the total polymer) are preferred for the best balance of properties. Concentrations of CNEA in the first stage polymer of about 4% are preferred to give the best linear oil swell resistance. Concentrations of 15 to 30% MEA in the first-stage polymer are preferred to give the best balance of properties.

Replacement of MEA with 2-ethoxyethyl acrylate in the above examples gives cured elastomers with similar properties but slightly poorer oil resistance. Replacement of CNEA with 2-cyanopropyl acrylate or 3-oxa-5-cyanopentyl acrylate in the above examples gives cured elastomers with similar properties.

EXAMPLES 40–46

Four stage heteropolymers are prepared by the same general procedure employed for two and three stage heteropolymers. The 2-chloroethyl vinyl ether is charged in the first stage to provide maximum incorporation into the polymer.

As seen in Table III, an improvement in oil resistance is possible by utilization of a highly cross-linked first stage elastomer. Gradually decreasing levels of butyl acrylate and butylene diacrylate with increasing content of ethyl acrylate outward from the butyl acrylate core provide the best results in this series of elastomers.

EXAMPLES 47-51

For comparison purposes, single stage elastomers are prepared such that all monomers are present for polymerization at one time. In Example 47 an elastomer is prepared using standard emulsion polymerization techniques such that all components of the multi-stage polymers of the earlier examples are polymerized at one time. In Examples 48 and 49, respectively, the first stage polymer and the last stage polymer are prepared separately. In Example 50 these separately prepared polymers of Examples 48 and 49 are blended together. Example 51 is a multi-stage elastomer representing a preferred embodiment of this invention. The test results obtained on the elastomers of the above polymers compounded with 40 phr. FEF carbon black and cured with mercaptobenzothiazyl disulfide/triethylene tetramine (MBTS/TETA) are shown in Table IV. Compression set is determined by compressing the elastomer 25% of its original thickness, aging the compressed elastomer at 300° F. in air for 70 hours and measuring the amount of set in terms of percentage of the original distance of compression; ASTM D395-61, Method B.

TABLE III.—PROPERTIES OF CURED, FILLED ELASTOMERS OF FOUR-STAGE HETEROPOLYMERS FROM BA AND EA

| Example | BA | CVE | BDA | BA | EA | BA | BDA | EA | BA | BDA | EA | Percent CVE in polymer | Tensile (p.s.i.) | Elongation percent | Percent linear oil swell | $T_f$, °C |
|---|---|---|---|---|---|---|---|---|---|---|---|---|---|---|---|---|
| 40 | 15 | 5 | (2%) | 20 | — | 20 | (1.5%) | — | 20 | (1%) | 20 | 2.43 | 980 | 190 | 14.1 | -38.5 |
| 41 | 15 | 5 | (2%) | 20 | — | 20 | (1.5%) | — | 20 | (1%) | 10 | 2.20 | 1,030 | 190 | 12.0 | -33.5 |
| 42 | 25 | 5 | (1%) | 10 | 5 | 10 | (1%) | 10 | 10 | (1%) | 25 | 2.40 | 960 | 150 | 14.0 | -35.5 |
| 43 | 25 | 5 | (1%) | 10 | 5 | 10 | (1%) | 10 | 10 | (1%) | 25 | 2.37 | 1,010 | 140 | 12.4 | -33.5 |
| 44 | 25 | 5 | (3%) | 10 | 10 | 5 | (2%) | 10 | 10 | (2.5%) | 25 | 2.28 | 1,000 | 130 | 11.9 | -33.5 |
| 45 | 40 | 5 | (4%) | 5 | 10 | 5 | (3%) | 10 | 5 | (2.5%) | 20 | 2.64 | 1,000 | 110 | 10.8 | -33.0 |
| 46 | 40 | 5 | (4%) | 5 | 10 | 5 | (3%) | 10 | 5 | (4%) | 20 | 3.10 | 870 | 90 | 9.9 | -33.5 |

TABLE IV.—PROPERTIES OF CURED, FILLED ELASTOMER OF ONE-STAGE POLYMERS AND BLENDS OF ONE-STAGE POLYMERS

| | Example | | | | |
|---|---|---|---|---|---|
| | 47 | 48 | 49 | 50 | 51 |
| Charged composition (parts): | | | | | |
| BA | 53 | 53 | 0 | 53 | 53 |
| MEA | 18 | 18 | 0 | 18 | 18 |
| CNEA | 4 | 4 | 0 | 4 | 4 |
| BDA | 0.075 | 0.075 | 0 | 0.075 | 0.075 |
| EA | 19 | 0 | 19 | 19 | 19 |
| AN | 6 | 0 | 6 | 6 | 6 |
| Method of preparation | (1) | (1) | (1) | (2) | (3) |
| $T_f$ (° C.) | -28.5 | -43 | +13½ | -41 | -39 |
| Linear oil swell (percent increase in ASTM #3 oil) | 7.2 | 12.8 | 1.6 | 10.0 | 9.4 |
| Tensile strength (p.s.i.) | 1,300 | 820 | 2,250 | 1,160 | 1,220 |
| 100% modulus (p.s.i.) | 210 | 150 | 1,630 | 560 | 670 |
| Elongation (percent) | 315 | 295 | 240 | 250 | 170 |
| Shore A Hardness (0-10 sec.) | 56-50 | 44-41 | 96-89 | 82-63 | 79-65 |
| After Heat Aging—70 hours at 300° F. in air | | | | | |
| Tensile strength (p.s.i.) | 1,380 | (4) | 2,510 | 4 510 | 1,180 |
| Elongation (percent) | 240 | 50 | 140 | 80 | 125 |
| Shore A Hardness (0-10 sec.) | 55-50 | 56-53 | — | 84-70 | 81-70 |
| Compression set (percent) | 72.8 | 68.1 | 91.7 | 72.7 | 61.1 |

[1] One-stage.
[2] Mixture of Examples 48 and 49.
[3] Two-stage (EA/AN in last stage).
[4] Became brittle upon aging.

The single-stage polymers do not offer a good balance of physical properties. The blend of single-stage polymers offers poor physical properties as compared to the multi-stage polymers of this invention. As compared to the single-stage polymers the elastomers of this invention offer a superior balance of characteristics, in particular oil resistance, thermal stability, good tensile properties and resistance to compression set. The processing characteristics of the two-stage elastomer of Example 51 are much better than those of the blend (Example 50) or any of the single stage polymers.

The invention in its broader aspects is not limited to the specific details shown and described. Departures may be made from such details without departing from the principles of the invention and without sacrificing its chief advantages.

What is claimed is:
1. As an article of manufacture, a curable acrylic elastomer formed of a polymer comprising:
(A) a first-stage addition polymer of
(a) at least 50% by weight of an alkyl acrylate, the homopolymer of which has a glass temperature below —35° C., or a mixture of alkyl acrylates, the copolymer of which has a glass temperature below —35° C.;
(b) 0 to 1% by weight of a polyethylenically unsaturated monomer selected from the group consisting of butylene diacrylate, butylene dimethacrylate and divinylbenzene;
(c) 15 to 35% by weight of a monomer chosen from the group consisting of alkoxyalkyl acrylate or alkylthioalkyl acrylate;
(d) 0 to 25% by weight of a monomer chosen from the group consisting of cyanoalkyl acrylate and cyanoalkoxy alkyl acrylate;
(e) 0 to 35% by weight of a different monoethylenically unsaturated monomer, and
(f) 0 to 10% by weight of curing-site monomer, and
(B) a final-stage prepared in the presence of the preformed polymer to at least partially encapsulate the preformed first stage comprising the vinyl addition polymerization product of:
(g) at least 60% by weight of alkyl acrylate or mixtures of alkyl acrylates chosen from the group consisting of ethyl acrylate and methyl acrylate,
(h) 0 to 40% by weight of another alkyl acrylate or a substituted alkyl acrylate,
(i) 0 to 40% by weight of an acrylic nitrile, and
(j) 0 to 10% by weight of said curing-site monomer.

2. The elastomer of claim 1 in which the polymer comprises a first stage addition polymer of 2 to 20% by weight of monomer chosen from the group consisting of cyanaolkyl acrylate and cyanoalkoxy alkyl acrylate.

3. The elastomer of claim 1, wherein the first-stage polymer comprises 50 to 80% by weight of the alkyl acrylate (a), and a sum of 20 to 50% by weight of the comonomers (c), (d), (e) and (f).

4. The elastomer of claim 1 formed of two polymer stages.

5. The elastomer of claim 4 wherein the alkyl acrylate (a) of the first-stage polymer is chosen from the group consisting of butyl acrylate, hexyl acrylate, and 2-ethylhexyl acrylate.

6. The elastomer of claim 4 in which ethyl acrylate is present in quantities of 95 to 99.5% by weight of the final stage and the curing-site monomer is vinyl chloroacetate present in quantities of 0.5 to 5% by weight of the elastomer.

7. The elastomer of claim 3 wherein the first-stage polymer alkyl acrylate (a) is present as butyl acrylate, the alkoxyalkyl acrylate (c) is present as methoxyethyl acrylate, the cyanoalkyl acrylate (d) is present as cyanoethyl acrylate and the curing-site monomer (f) is present as vinyl chloroacetate.

8. The elastomer of claim 7 wherein sufficient vinyl chloroacetate is incorporated to produce in the elastomer a chlorine content of about 0.1 to about 0.4 weight percent chlorine.

9. A vulcanized, acrylic elastomer of the composition of claim 1.

10. A vulcanized acrylic elastomer of the composition of claim 3.

11. A vulcanized acrylic elastomer of the composition of claim 4.

12. A vulcanized acrylic elastomer of the composition of claim 7.

13. The elastomer of claim 4 in which the weight ratio of the first-stage polymer (A) to the final-stage polymer (B) is from about 1:1 to 4:1.

14. The elastomer of claim 1 in which the first stage polymer comprises 45 to 84% by weight alkyl acrylate (a), from 15 to 35% alkoxyalkyl acrylate (c), from 2 to 15% cyanoalkyl acrylate (d), and from 0 to 5% of the curing-site monomer, and the final-stage polymer comprises 95 to 100% by weight ethyl acrylate and 0 to 5% of said curing-site monomer.

15. The elastomer of claim 14 in which the curing-site monomer is present in quantities of 0.5 to 5% by weight in at least one polymer stage.

16. The elastomer of claim 15 in which the first-stage polymer comprises 20 to 30% by weight of an alkoxyalkyl acrylate and from 2 to 12% of a cyanoalkyl acrylate.

17. The elastomer of claim 15 in the first-stage copolymer wherein (a) is butyl acrylate, and (c) is methoxyethyl acrylate, (d) is cyanoethyl acrylate, and (f) is vinyl chloroacetate.

18. The elastomer of claim 17 in which sufficient vinyl chloroacetate is incorporated to produce a chlorine content of about 0.1 to about 0.35% chlorine on the weight of the elastomer.

19. The elastomer of claim 1 in which the polymer of the final stage consists essentially of 60 to 100% by weight ethyl acrylate and 0 to 40% acrylonitrile.

20. A vulcanized acrylic elastomer having the composition of claim 14.

21. A vulcanized acrylic elastomer having the composition of claim 15.

22. A vulcanized acrylic elastomer having the composition of claim 16.

23. A vulcanized acrylic elastomer having the composition of claim 17.

24. A vulcanized acrylic elastomer having the composition of claim 18.

25. A process for forming a vulcanizable acrylic elastomer containing at least two polymers, said process comprising
(A) polymerizing
(a) at least 50 parts of at least one alkyl acrylate whose homopolymer or copolymer has a glass temperature below —35° C.,
(b) 0 to 5 parts of polyethylenically unsaturated monomer, selected from the group consisting of butylene diacrylate, butylene dimethacrylate, and divinylbenzene,
(c) 15 to 35 parts of alkoxyalkyl acrylate or alkylthioalkyl acrylate,
(d) 2 to 20 parts of cyanoalkyl acrylate or cyanoalkoxyalkyl acrylate,
(e) 0 to 35 parts of a different monoethylenically unsaturated monomer,
(f) from 0 to 10 parts of curing-site monomer, and
(B) polymerizing a final-stage polymer in the presence of the preformed first-stage polymer under such conditions to cause the final-stage polymer to at least partially encapsulate the initial stage polymer, the final-stage polymer being formed by polymerizing
(f) 60 to 100 parts ethyl acrylate and/or methyl acrylate,
(g) 0 to 40 parts of other alkyl acrylates or substituted alkyl acrylates,
(h) 0 to 40 parts of an acrylic nitrile, and
(i) 0 to 10 parts of said curing-site monomer.

26. The process of claim 25 in which the polymerization in each stage is carried substantially to completion before the succeeding polymerization stage is charged, under such conditions that each succeeding stage at least partially encapsulates the polymer of the preceding stage or stages.

(References on following page)

References Cited

UNITED STATES PATENTS

| | | | |
|---|---|---|---|
| 2,958,673 | 11/1960 | Jen | 260—885 |
| 3,488,331 | 1/1970 | Jorgensen | 260—80.76 |
| 3,450,681 | 6/1969 | Gobran et al. | 260—80.72 |
| 3,660,537 | 5/1972 | Fryd et al. | 260—885 |
| 3,668,274 | 6/1972 | Owens et al. | 260—857 G |

FOREIGN PATENTS

| | | | |
|---|---|---|---|
| 1,045,786 | 10/1966 | Great Britain | 260—885 |
| 1,507,934 | 12/1967 | France | 260—885 |

MURRAY TILLMAN, Primary Examiner

J. SEIBERT, Assistant Examiner

U.S. Cl. X.R.

260—29.6 RB, 41 R, 41 C, 79.7, 80.76, 80.81, 86.1 R, 86.1 N, 86.1 E, 86.3, 86.7, 835, 883, 884, 885